(12) United States Patent
Liu et al.

(10) Patent No.: US 9,098,427 B2
(45) Date of Patent: Aug. 4, 2015

(54) CONTROLLING ACCESS TO GROUPS OF MEMORY PAGES IN A VIRTUALIZED ENVIRONMENT

(71) Applicant: Intel Corporation, Santa Clara, CA (US)

(72) Inventors: Baohong Liu, Cupertino, CA (US); Ritu Sood, Milpitas, CA (US); Kuo-Lang Tseng, Cupertino, CA (US); Madhukar Tallam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 13/716,447

(22) Filed: Dec. 17, 2012

(65) Prior Publication Data

US 2014/0173169 A1 Jun. 19, 2014

(51) Int. Cl.
*G06F 12/00* (2006.01)
*G06F 12/10* (2006.01)
*G06F 12/14* (2006.01)

(52) U.S. Cl.
CPC .......... *G06F 12/1009* (2013.01); *G06F 12/145* (2013.01); *G06F 12/109* (2013.01); *G06F 2212/151* (2013.01)

(58) Field of Classification Search
None
See application file for complete search history.

(56) References Cited

U.S. PATENT DOCUMENTS

| | | | |
|---|---|---|---|
| 2005/0102671 A1 | 5/2005 | Baumberger | |
| 2006/0259732 A1 | 11/2006 | Traut et al. | |
| 2008/0147956 A1* | 6/2008 | Rawson | 711/6 |
| 2008/0155168 A1* | 6/2008 | Sheu et al. | 711/6 |
| 2009/0172341 A1 | 7/2009 | Durham et al. | |
| 2011/0131388 A1 | 6/2011 | Chen et al. | |
| 2011/0320681 A1* | 12/2011 | Borntraeger et al. | 711/6 |
| 2012/0265963 A1 | 10/2012 | Agesen | |

FOREIGN PATENT DOCUMENTS

WO 2014/098979 A1 6/2014

OTHER PUBLICATIONS

International Search Report and Written Opinion Received for PCT Application No. PCT/US2013/046186, Mailed on Nov. 14, 2013, 9 pages.

* cited by examiner

*Primary Examiner* — Brian Peugh
(74) *Attorney, Agent, or Firm* — Thomas R. Lane

(57) ABSTRACT

Embodiments of an invention for controlling access to groups of memory pages in a virtualized environment are disclosed. In one embodiment, a processor includes a virtualization unit and a memory management unit. The virtualization unit is to transfer control of the processor to a virtual machine. The memory management unit is to perform, in response to an attempt to execute on the virtual machine an instruction stored on a first page, a page walk through a paging structure to find a second page and to allow access to the second page without exiting the virtual machine based at least in part on a bit being set in a leaf level entry corresponding to the second page in the paging structure and a corresponding bit being set in each entry corresponding to the first page in each level of the paging structure.

20 Claims, 3 Drawing Sheets

METHOD 200

METHOD 300

CONTROLLING ACCESS TO GROUPS OF MEMORY PAGES IN A VIRTUALIZED ENVIRONMENT

BACKGROUND

1. Field

The present disclosure pertains to the field of information processing, and more particularly, to the field of memory management and protection.

2. Description of Related Art

Access to the contents of memory in an information processing system may be controlled by using read, write, and execute bits in page tables. In a virtualized environment, multiple views of memory may be provided by using different sets of page tables for different virtual machines, such that a virtual machine monitor may provide and enforce different access permissions for different guest software.

BRIEF DESCRIPTION OF THE FIGURES

The present invention is illustrated by way of example and not limitation in the accompanying figures.

DETAILED DESCRIPTION

Figure 1:
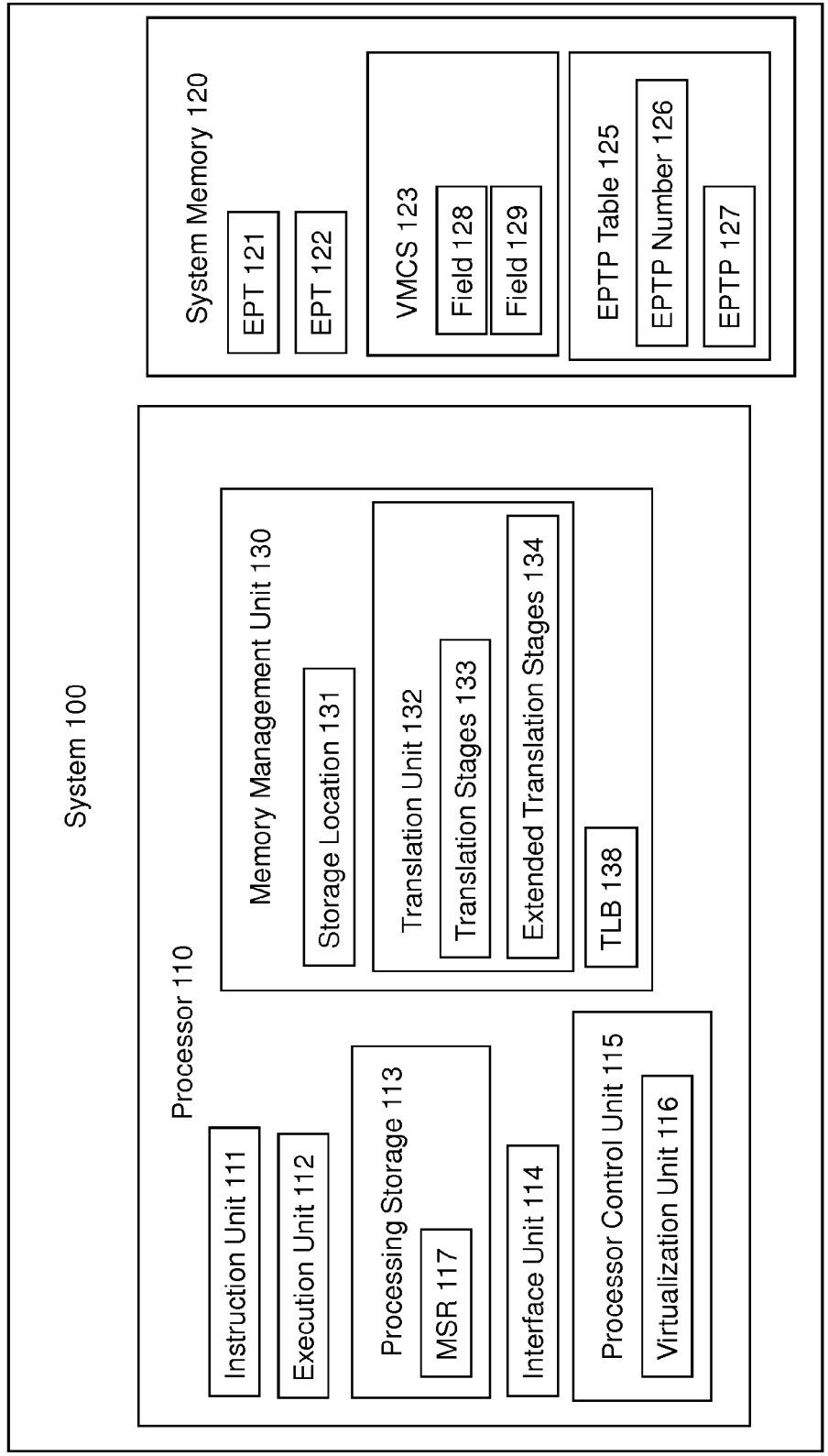
FIG. 1 illustrates a system in which access to groups of memory pages in a virtualized environment may be controlled according to an embodiment of the present invention.

Embodiments of an invention for controlling access to groups of memory pages in a virtualized environment are described. In this description, numerous specific details, such as processor and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

As described in the background section, access to memory pages may be controlled using read, write, and execute bits in page tables. In a virtualized environment, multiple views of memory may be provided by using different sets of page tables for different virtual machines, such that a virtual machine monitor (VMM) may provide and enforce different access permissions for different guest software. However, switching between these views may require transferring control of the processor from guest software to the VMM. Embodiments of the present invention provide for the accessibility of data pages to change within a virtual machine without causing a VM exit.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor 110 and system memory 120, which may be dynamic random access memory or any other type of medium readable by processor 110. Systems embodying the present invention may include any number of each of these components and any other components or other elements, such as information storage devices, peripherals, and input/output devices. Any or all of the components or other elements in any system embodiment, may be connected, coupled, or otherwise in communication with each other through any number of buses, point-to-point, or other wired or wireless interfaces or connections.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage 113, interface unit 114, processor control unit 115, and memory management unit (MMU) 130. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or other hardware, such as an arithmetic unit, logic unit, floating point unit, shifter, etc., for processing data and executing instructions, micro-instructions, and/or micro-operations.

Processing storage 113 may represent any type of storage usable for any purpose within processor 110; for example, it may include any number of data registers, instruction registers, status registers, configuration registers, control registers, other programmable or hard-coded registers or register files, or any other storage structures.

Interface unit 114 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control unit 115 may include any logic, microcode, circuitry, or other hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Virtualization unit 116 may be included in processor control unit 115 and may include any logic, microcode, circuitry, or other hardware to enable, assist, or support the sharing and/or allocating of resources among virtual machines (each, a "VM") running on processor 110, and the transfer of control from a VMM or other control program, having direct control over the resources, to software programs or modules ("guests") running within a virtual machine (a "VM entry"), the transfer of control back to the VMM (a "VM exit"), and the transfer of control among VMs. A virtual machine control structure ("VMCS") or other data structure may be used to store state, control, and other information for each VM.

Processor 110 also includes MMU 130 to manage the memory space of processor 110. Memory management logic supports the use of virtual memory to provide software, including guest software running in a VM, with an address space for storing and accessing code and data that is larger than the address space of the physical memory in the system, e.g., system memory 120. The virtual memory space of processor 110 may be limited only by the number of address bits available to software running on the processor, while the physical memory space of processor 110 is further limited to the size of system memory 120. MMU 130 supports a memory management scheme, such as paging, to swap the executing software's code and data in and out of system memory 120 on an as-needed basis. As part of this scheme, the software may access the virtual memory space of the processor with an un-translated address that is translated by the processor to a translated address that the processor may use to access the physical memory space of the processor.

Accordingly, MMU 130 may include one or more storage location 131, translation unit 132, and translation lookaside buffer ("TLB") 135. Translation unit 132 includes logic, circuitry, or other hardware that may be represented as translation stages 133 to perform address translations, for example the translation of a virtual, logical, linear, or other un-translated address to a physical or other translated address in a series of stages, according to any known memory management technique, such as paging. To perform these address translations, translation stages 133 refer to one or more data structures stored in processor 110, system memory 120, any other storage location in system 100 not shown in FIG. 1, and/or any combination of these locations. The data structures may include page directories and page tables according to the architecture of the Pentium® Processor Family, as modified according to embodiments of the present invention, and/or a table stored in TLB 135.

Storage location 131 may be any register or other storage location used to store a pointer to a data structure used by translation unit 132. In one embodiment, storage location 131 may be that portion of the CR3 register referred to as PML4 Base, used to store the page map level 4 base address, according to the architecture of the Pentium® Processor Family.

In one embodiment, one or more translation stages 133 receive a linear address provided by an instruction to be executed by processor 100. Translation stages 133 use portions of the linear address as indices into hierarchical tables, including page tables, to perform a page walk. The page tables contain entries, each including a field for a base address of a page in memory 120, for example, bits 39:12 of a page table entry according to the Pentium® Processor Family's Extended Memory 64 Technology. Any page size (e.g., 4 kilobytes) may be used within the scope of the present invention. Therefore, the linear address used by a program to access system memory 120 may be translated to a physical address used by processor 100 to access system memory 120.

The linear address and the corresponding physical address may be stored in TLB 135, so that the appropriate physical address for future accesses using the same linear address may be found in TLB 135 and another page walk is not required. The contents of TLB 135 may be flushed when appropriate, for example on a context switch, typically by an operating system.

In a virtual machine environment, a VMM may need to have ultimate control over the resources of MMU 130 in order to protect the memory space of one guest from another guest. Therefore, in one embodiment, virtualization unit 116 may include logic to cause a VM exit if a guest issues an instruction that is intended to change the contents of storage location 131 or TLB 135, or otherwise modify the operation of MMU 130. The VMM may then maintain MMU 130 along with multiple sets of paging or other data structures (e.g., one set per VM) to provide for correct operation of system 110 such that each virtual machine appears to provide complete control of its memory management resources to an operating system.

In some embodiments, MMU 130 may include logic, circuitry, or other hardware to support virtual machines. For example, translation stages 133 may be configured to translate a linear address to a physical address, using a data structure pointed to by the contents of storage location 131, as described above. If this translation is performed for a guest, the linear address is referred to as a guest linear address, a resulting physical address is referred to as a guest physical address ("GPA"), and additional translations are needed to translate GPAs to host physical addresses ("HPAs"). These additional translations may use a series of extended translation stages 134, using additional data structures such as or including extended or nested page tables. In this embodiment, the translation data structures for the guest may be maintained by an OS running on a virtual machine, while the translation data structures for the host are maintained by the VMM. These additional translations may be enabled by a VM entry and disabled by a VM exit.

Typically, an entry in a translation data structure includes an address or a portion of an address that is combined, by translation unit 132, with a portion of the un-translated address to point to an entry in a successive translation data structure, i.e., a translation data structure for the next stage. However, an entry in the translation data structure for the last stage may be or may include a physical address of a location in memory 120. In an embodiment supporting virtual machines, an address from an entry in a data structure may undergo an additional translation before it is used as a pointer to the next stage. As an example, one embodiment may use page tables to translate a linear address to a physical address when not operating within a virtual machine. When operating within a virtual machine, these same page tables may be used, but between each page table and after the last page table, an additional translation is performed, using a set of extended (or nested) page tables, to translate a page table entry from a GPA to an HPA. After translation, a GPA and its corresponding HPA may be stored in TLB 135, so that another page walk is not required. Embodiments of the present invention may be implemented in page tables, extended (or nested) page tables, and/or any other data structure used by MMU 130. As used herein, "extended page table" is meant to include "nested page table" and any other type of data structure used for the additional translations to support virtual machines.

In one embodiment using extended page tables, a pointer to the first extended page table is stored in a VMCS. A first stage of translation stages 133 combines this pointer with a first portion (e.g., bits 38:30 of a 64-bit address) of a GPA to find an entry in the first extended page table. This entry includes an HPA that is a pointer to a second extended page table. A second stage of translation stages 133 combines this pointer with a second portion (e.g., bits 29:21 of the 64-bits address) of the GPA to find an entry in the second extended page table. This entry includes an HPA that is a pointer to a third extended page table. A third stage of translation stages 133 combines this pointer with a third portion (e.g., bits 20:12 of the 64-bit address) of the GPA to find an entry in the third extended page table. This entry includes the translated address.

In one embodiment, fields or bits in the format of an entry may be used to define access permissions. For example, a read permission bit (e.g., bit 0 or the R bit) may be used to indicate whether a read is permitted, a write permission bit (e.g., bit 1 or the W bit) may be used to indicate whether a write is permitted, and an execute permission bit (e.g., bit 2 or the X bit) may be used to indicate whether execution is permitted. If the values of any of these bits indicate that the access is not permitted, then an error will be reported. These types of permissions may be logically combined for each stage or level of a page walk (including a page walk through page tables and extended page tables), such that the most restrictive of the permissions applies.

However, read and write permissions may not be the same for all of the different instruction pages trying to access them. Therefore, embodiments of the present invention provide for grouping of instruction pages such that different groups of instruction pages may be given different access permissions to different groups of data pages, and these different access permissions may be enforced within a virtual machine without causing a VM exit. In some embodiments, the bits or fields used to define or identify the different groups may be bits or fields that are ignored, unused, or otherwise available according to a known paging format. For example, in the Extended Page Table (EPT) format of the Pentium® Processor Family, bits [63:52] may be available for use. However, embodiments of the present invention are not limited to using these particular bits; any bits may be used.

As an example, access to data in a first group of pages (Group A) may be classified into three categories. Instructions (e.g., trusted code) from pages in a second group (Group U) may always be allowed. Instructions (e.g., untrusted code) from pages in a third group (Group V) may never be allowed. Instructions from pages in a fourth group (Group W) may require a case by case decision to be made after a VM exit. However, access by instructions from Groups U and V may be handled by memory management unit 130 without a VM exit.

Embodiments of the present invention may be used to control write access (using the W bit as described below), read access (using the R bit according to a parallel approach), or both, without a VM exit. For example, a group of data pages may be defined as Group A, a group of pages storing operating system kernel code may be defined as Group U, a group of pages storing a user driver may be defined as Group V, an embodiment may provide for the access to be controlled without a VM exit such that Group U has write and read access and Group V has read but not write access.

For a page to be included in Group A when it is accessed for data, bit 52 in the leaf (e.g., last) level entry of its EPT paging structure may be set. Bit 1 (the write permission bit) may also be cleared to indicate that the page is protected from write access; however, it may nevertheless be writable, without a VM exit, depending on the setting of other bits as described herein. Bit 0 (the read permission bit) may be set, to indicate that the page is readable. In one embodiment, if the read permission bit is not set, then the page is not writable (absent a VM exit) regardless of the settings of other bits as described herein.

For a page to be included in Group U when an instruction from the page is attempting to access data, bit 52 in all levels of its EPT page structures may be set, such that the logical AND of bit 52 from all levels is '1', and bit 58 may be cleared in at least one level, such that the logical AND of bit 52 from all levels is '0'. For a page to be included in Group V when an instruction from the page attempts to access data, bit 52 may be cleared in one level, such that the logical AND of bit 52 from all levels is '0', and bit 58 may be set in all levels, such that the logical AND of bit 58 from all levels is '1'. For a page to be included in Group W when an instruction from the page attempts to access data, bit 58 in at least one level and bit 52 in at least one level may be cleared, such that the logical AND of the bit 58 from each level is '0' and the logical AND of the bit 52 from each level is also '0'.

Then, for example, when an instruction tries to write data to a page in Group A, the page walk by MMU 130 does not automatically result in a VM exit even though the W bit is '0'. Instead, MMU 130 determines whether the attempted access is automatically allowed, automatically not allowed, or results in a VM exit based on bit 52 of the leaf level entry to the data page and bits 52 and 58 of each level's entry to the instruction page. Since bit 52 of the data page is '1', the logical AND of bit 52 from each EPT level for the instruction page and the logical AND of bit 58 from each EPT level for the instruction page are used to determine whether the instruction page is in Group U, V, or W. If the instruction page is in Group U, the access is allowed without a VM exit. If the instruction page is in Group V, the access is denied without a VM exit, and the instruction may be skipped. If the instruction page is in Group W, a VM exit is caused where the reason may be an EPT violation.

Other groups of data pages and groups of instruction pages corresponding to those data pages may also be defined using other bits. For example, bit 53 may be used (as described above for bit 52) to defined a Group B of data pages, and bits 53 and 59 may be used (as described above for bits 52 and 58, respectively) to defined a Group X, a Group Y, and a Group Z of instruction pages for the Group B data pages. In one embodiment, six different groups of data pages (using one of bits 57:52 for each group of data pages and one of bits 57:52 and one of bits 63:58 for each corresponding group of instruction pages). Instruction pages from different groups may overlap. For example, a page may be in Group U and in Group X, in which case it may access, without a VM exit, data from a page in Group A and in Group B.

In some embodiments, additional data page groups may be defined. For example, six data page groups, referred to as F1, E1, D1, C1, B1, and A1, may use bits [57:52], respectively, for data pages and bits [57:52] and [63:58] for their corresponding instruction pages, and an additional six data page groups, referred to as F2, E2, D2, C2, B2, and A2, may also use bits [57:52], respectively, for data pages and bits [57:52] and [63:58] for their corresponding instruction pages. Since the first six groups use the same bits as the last six groups, two different EPT structures are used (e.g., EPT1 for F1, E1, D1, C1, B1, and A1; and EPT2 for F2, E2, D2, C2, B2, and A2; where FIG. 1 shows EPT1 as EPT 121 and EPT2 as EPT 122), and an EPT view switch may be used to switch between the two different EPT structures. Embodiments of the present invention provide for this view switch to occur without a VM exit, using, for example, bits [63:58] of the leaf level entries to the data pages to form an integer to serve as an EPT number. For example, the EPT number for EPT1 may be '1' and the EPT number for EPT2 may be '2'. Then, in EPT1, a leaf level entry to a data page in A1, B1, C1, D1, E1, or F1 will have bits [63:58] cleared to indicate that no view switch is needed, but a leaf level entry to a data page in A2, B2, C2, D2, E2, or F2 will have the value '2' stored in bits [63:58] to cause a view switch to EPT2. Then, in EPT2, a leaf level entry to a data page in A2, B2, C2, D2, E2, or F2 will have bits [63:58] cleared to indicate that no view switch is needed, but a leaf level entry to a data page in A1, B1, C1, D1, E1, or F1 will have the value '1' stored in bits [63:58] to cause a view switch to EPT1. Therefore, a view switch to accommodate a greater number of groups of data pages may be performed without a VM exit. The number of groups of data pages that may be accommodated with and without a view switch may be determined by the number of bits used in the EPT format for various embodiments of the invention. The number of bits available for software to use in the entry format of the EPT paging structure may be found with the CPU ID instruction and/or in a storage location in processing storage 113, such as model specific register 117. Software (e.g., a VMM) may use all or some of the available bits to implement an embodiment of the present invention, and may use some or all for another purpose. Therefore, a new field (e.g., field 128) may be added to the VMCS (e.g., VMCS 123) to indicate the number of bits to be used to implement an embodiment of the present invention, as well as their location in the EPT paging structure entry format. For purposes of this description, these bits may be referred to as a page group field.

In some embodiments, the techniques described above may also be used for an instruction fetch (using the X bit in a parallel approach), in addition or instead of a data access. Therefore, embodiments may provide for distinguishing between an EPT number for an instruction fetch, a data write, and/or a data read. For example, in an embodiment applying the techniques to an instruction fetch and a data write, an EPT number, such as in bits [63:58] as described above, may refer to an EPT structure to be switched to for an instruction fetch or a data write. Therefore, any one or more of bits [57:52] may be used to differentiate.

Furthermore, to provide for a view switch, a pointer to the new EPT structure may be provided. In some embodiments, a new field may be added to the VMCS (e.g., VMCS 123) for this purpose. The new field (e.g., field 129) may be used to point to a data structure (e.g., EPTP table 125) in system memory to link an EPT number, for example from bits [63:58] as described above (e.g. EPT number 126), to a pointer (e.g., EPTP 127) to the corresponding EPT structure.

Figure 2:
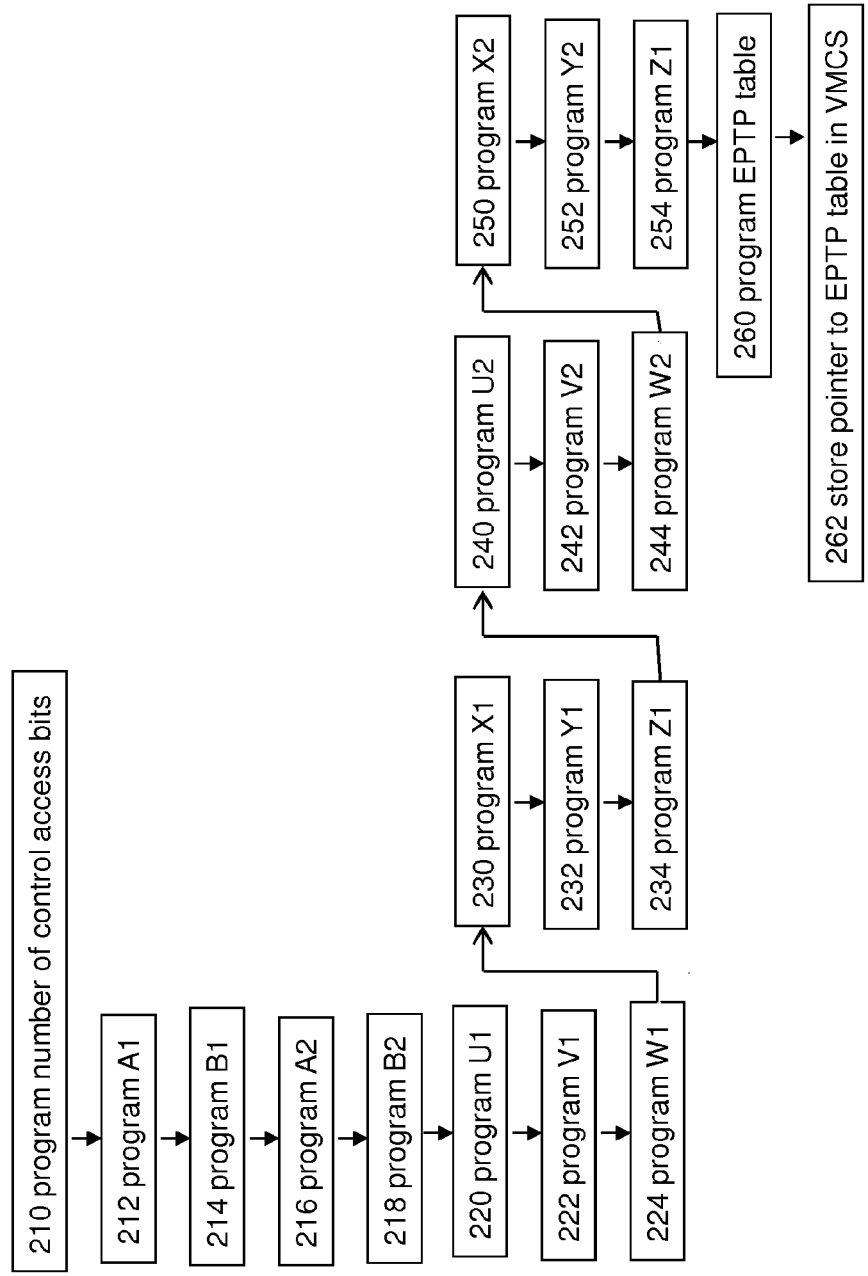
FIGS. 2 and 3 illustrate a method for controlling access to groups of memory pages in a virtualized environment according to an embodiment of the present invention.
Figure 3:
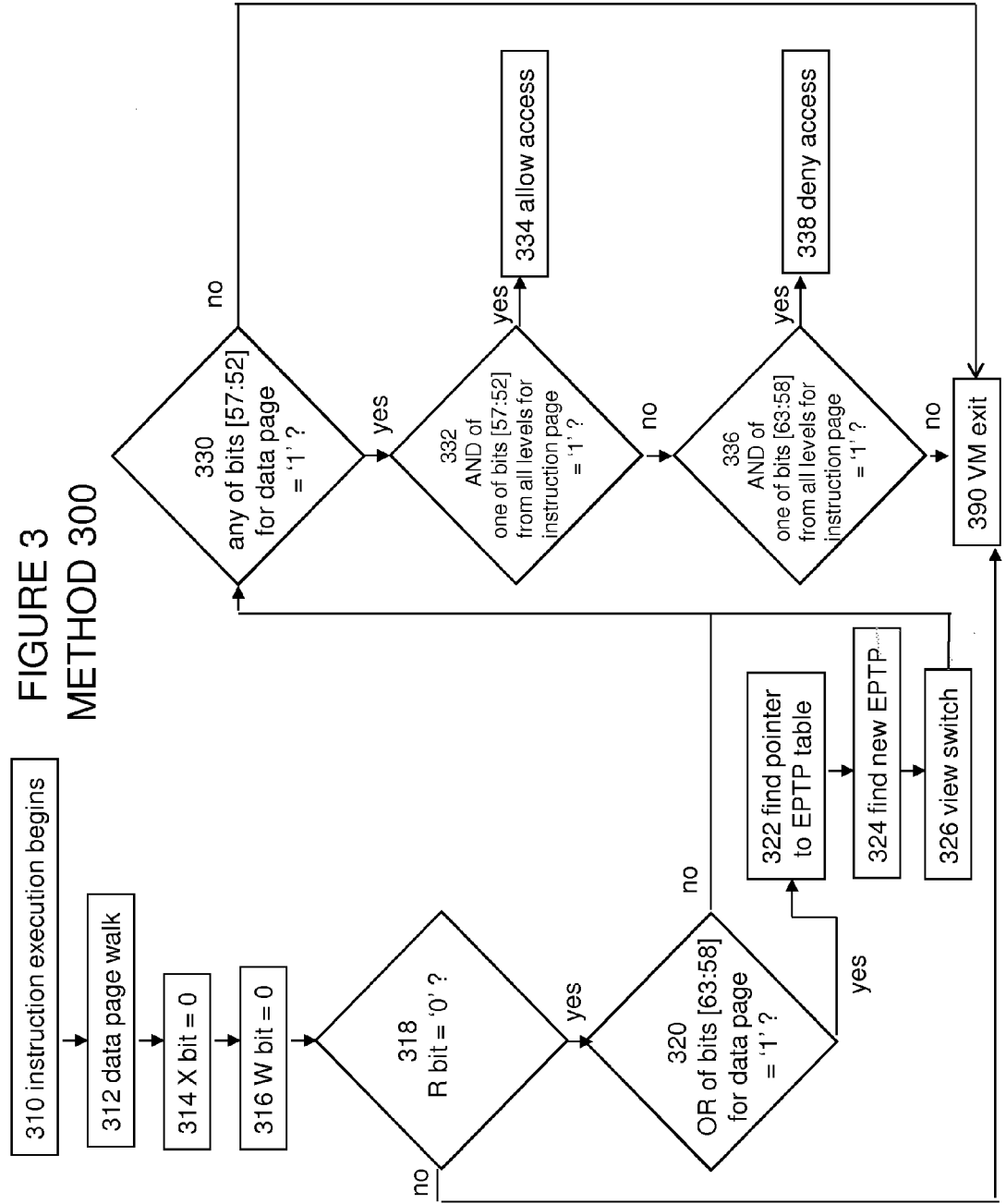

FIGS. 2 and 3 illustrate methods 200 and 300 for controlling access to groups of memory pages in a virtualized environment according to an embodiment of the present invention. Although method embodiments of the invention are not limited in this respect, reference may be made to elements of FIG. 1 to help describe the method embodiments of FIGS. 2 and 3. Method 200 may be performed by a VMM operating outside of a VM to prepare for performing method 300 within the VM without causing a VM exit. Method 200 includes setting up four different groups of data pages (e.g., A1, B1, A2, and B2), two in each of two different paging structures (e.g., EPT1 and EPT2), and two different groups of instruction pages for each group of data pages (e.g., U1/V1/W1 for A1, X1/Y1/Z1 for B1, U2/V2/W2 for A2, and X2/Y2/Z2 for B2). However, any number of each group and any number of paging structures may be used within the scope of the present invention.

In box 210 of method 200, a processor is programmed with a number of bits to use for controlling access to groups of memory pages. In box 212, a first group of pages to which access is to be controlled (e.g., A1) is defined by storing a first set of values in their page group fields in a first paging structure (e.g., EPT1). In box 214, a second group of pages to which access is to be controlled (e.g., B1) is defined by storing a second set of values in their page group fields in a first paging structure (e.g., EPT1). In box 216, a third group of pages to which access is to be controlled (e.g., A2) is defined by storing a third set of values in their page group fields in a second paging structure (e.g., EPT2). In box 218, a fourth group of pages to which access is to be controlled (e.g., B2) is defined by storing a fourth set of values in their page group fields in the second paging structure (e.g., EPT2).

In box 220, a first group of instruction pages (e.g., U1) for accessing A1 is defined by storing a fifth set of values in their page group fields in the first paging structure (e.g. EPT1). In box 222, a second group of instruction pages (e.g., V1) for accessing A1 is defined by storing a sixth set of values in their page group fields in the first paging structure (e.g. EPT1). In box 224, a third group of instruction pages (e.g., W1) for accessing A1 is defined by storing a seventh set of values in their page group fields in the first paging structure (e.g. EPT 1).

In box 230, a fourth group of instruction pages (e.g., X1) for accessing B1 is defined by storing an eighth set of values in their page group fields in the first paging structure (e.g. EPT1). In box 232, a fifth group of instruction pages (e.g., Y1) for accessing B1 is defined by storing a ninth set of values in their page group fields in the first paging structure (e.g. EPT1). In box 234, a sixth group of instruction pages (e.g., Z1) for accessing B1 is defined by storing a tenth set of values in their page group fields in the first paging structure (e.g. EPT1).

In box 240, a seventh group of instruction pages (e.g., U2) for accessing A2 is defined by storing a eleventh set of values in their page group fields in the second paging structure (e.g. EPT2 ). In box 242, an eighth group of instruction pages (e.g., V2) for accessing A2 is defined by storing a twelfth set of values in their page group fields in the second paging structure (e.g. EPT2). In box 244, a ninth group of instruction pages (e.g., W2) for accessing A2 is defined by storing a thirteenth set of values in their page group fields in the second paging structure (e.g. EPT2).

In box 250, a tenth group of instruction pages (e.g., X2) for accessing B2 is defined by storing an fourteenth set of values in their page group fields in the second paging structure (e.g. EPT2). In box 252, a eleventh group of instruction pages (e.g., Y2) for accessing B2 is defined by storing a fifteenth set of values in their page group fields in the second paging structure (e.g. EPT2). In box 254, a twelfth group of instruction pages (e.g., Z2) for accessing B2 is defined by storing a sixteenth set of values in their page group fields in the second paging structure (e.g. EPT2).

In box 260, a table is stored in memory to link EPT numbers to EPT pointers. In box 262, a pointer to the table is stored in a VMCS.

In box 310 of method 300, execution of an instruction in a VM is initiated. All of method 300 may be performed without causing a VM exit until block 390. The instruction is from a first memory page (the "instruction page") and the instruction attempts to write data to a second memory page (the "data page").

In box 312, a page walk including a walk through the active EPT structure (e.g., EPT1) is performed to find the physical address of the data page in system memory. In box 314, it is determined that the execute permission bit for the data page is '0' in at least one level of EPT1. In box 316, it is determined that the write permission bit for the data page is '0' in at least one level of EPT1. In box 318, it is determined whether the read permission bit for the data page is '1' in all levels of EPT1. If so, method 300 continues in box 320; if not, method 300 jumps to box 390 for a VM exit.

In box 320, it is determined whether the logical OR of bits [63:58] of the leaf level entry in EPT1 for the data page is '1'. If so, it means that a view switch is to be performed, and method 300 continues in box 322. If not, method 300 jumps to box 330.

In box 322, a pointer to an EPTP table is found in the VMCS. In box 324, the EPTP table is used to find the EPTP corresponding to the EPT number stored in bits [63:58] of the data page. In box 326, a view switch to the new EPT structure (EPT2) is performed.

In box 330, it is determined whether any of bits [57:52] in the leaf level entry in EPT2 for the data page is '1' (for example, bit 52). If so, method 300 continues in box 332. If not, method 300 jumps to box 390 for a VM exit.

In box 332, it is determined whether the logical AND of one of bits [57:52] of each entry in all levels of EPT2 for the instruction page is '1', where the bit position that is checked is the bit position found to be '1' in box 330. If so, then in box 334, the access is allowed, without a VM exit, and the instruction is executed by the VM. If not, then in box 336, it is determined whether logical AND of one of bits [63:58] of each entry in all levels of EPT2 for the instruction page is '1', where the bit position that is checked is the bit position that corresponds to the bit position found to be '1' in box 330 (e.g., bit 58 for instruction corresponds to bit 52 for data). If so, then in box 338, the access is denied, without a VM exit, the instruction is skipped, and execution of the next instruction by the VM is initiated. If not, then in box 390, a VM exit is initiated.

In various embodiments of the present invention, the method illustrated in FIGS. 2 and 3 may be performed in a different order, with illustrated boxes combined or omitted, with additional boxes added, or with a combination of reordered, combined, omitted, or additional boxes.

Embodiments of the present invention may be embodied in data stored on a machine-readable medium, where the data represents a design or other information usable to fabricate all or part of processor 100.

Thus, embodiments of an invention for controlling access to groups of memory pages have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
a virtualization unit to transfer control of the processor to a virtual machine;
a memory management unit to perform, in response to a first attempt to execute on the virtual machine a first instruction stored on a first page, a first page walk through a first paging structure to find a second page and to allow access to the second page without exiting the virtual machine based at least in part on a first bit being set in a first leaf level entry corresponding to the second page in the first paging structure and a corresponding second bit being set in each entry corresponding to the first page in each level of the first paging structure.

2. The processor of claim 1, wherein the memory management unit is also to perform, in response to a second attempt to execute on the virtual machine a second instruction stored on a third page, a second page walk through the first paging structure to find the second page and to deny access to the second page without exiting the virtual machine based at least in part on the first bit being set in the first leaf level entry corresponding to the second page in the first paging structure and a corresponding third bit being set in each entry corresponding to the third page in each level of the first paging structure.

3. The processor of claim 2, wherein the memory management unit is also to perform, in response to a third attempt to execute on the virtual machine a third instruction stored on a fourth page, a third page walk through the first paging structure to find a fifth page and to allow access to the fifth page without exiting the virtual machine based at least in part on a fourth bit being set in a second leaf level entry corresponding to the fifth page in the first paging structure and a corresponding fifth bit being set in each entry corresponding to the fourth page in each level of the first paging structure.

4. The processor of claim 3, wherein the memory management unit is also to perform, in response to a fourth attempt to execute on the virtual machine a fourth instruction stored on a sixth page, a fourth page walk through the first paging structure to find the fifth page and to deny access to the fifth page without exiting the virtual machine based at least in part on the fourth bit being set in the second leaf level entry corresponding to the fifth page in the first paging structure and a corresponding sixth bit being set in each entry corresponding to the sixth page in each level of the first paging structure.

5. The processor of claim 4, wherein the memory management unit is also to perform, in response to a fifth attempt to execute on the virtual machine a fifth instruction stored on a seventh page, a fifth page walk through the first paging structure to find the eighth page and to perform a view switch to a second paging structure without exiting the virtual machine based at least in part on logical OR of a group of bits in a third leaf level entry corresponding to the eighth page in the first paging structure being '1'.

6. The processor of claim 5, wherein the first group of bits does not include the first bit or the fourth bit.

7. The processor of claim 6, further comprising a storage location to indicate the number of bits in the group.

8. A method comprising:
entering a virtual machine;
performing a first page walk through a first paging structure in response to a first attempt to execute in the virtual machine a first instruction stored on a first page;
finding a second page through the first page walk;
determining that a first bit in a first leaf level entry corresponding to the second page in the first paging structure is set;
determining that a corresponding second bit in each entry corresponding to the first page in each level of the first paging structure is set; and
allowing access to the second page without exiting the virtual machine.

9. The method of claim 8, further comprising, after entering the virtual machine:
performing a second page walk through the first paging structure in response to a second attempt to execute in the virtual machine a second instruction stored on a third page;
finding the second page through the second page walk;
determining that a third bit in a first lead level entry corresponding to the second page in the first paging structure is set;
determining that a corresponding fourth bit in each entry corresponding to the third page in each level of the first paging structure is set; and
denying access to the second page without exiting the virtual machine.

10. The method of claim 9, further comprising, after entering the virtual machine:
performing a third page walk through the first paging structure in response to a third attempt to execute in the virtual machine a third instruction stored on a fourth page;
finding a fifth page through the third page walk;
determining that a fifth bit in a second leaf level entry corresponding to the fifth page in the first paging structure is set;
determining that a corresponding sixth bit in each entry corresponding to the fourth page in each level of the first paging structure is set; and
allowing access to the fifth page without exiting the virtual machine.

11. The method of claim 10, further comprising, after entering the virtual machine:
performing a fourth page walk through the first paging structure in response to a fourth attempt to execute in the virtual machine a fourth instruction stored on a sixth page;
finding the fifth page through the fourth page walk;
determining that a seventh bit in the second leaf level entry corresponding to the fifth page in the first structure is set;
determining that a corresponding eighth bit in each entry corresponding to the sixth page in each level of the first paging structure is set; and
denying access to the fifth page without exiting the virtual machine.

12. The method of claim 11, further comprising, after entering the virtual machine:
performing a fifth page walk through the first paging structure in response to a fifth attempt to execute in the virtual machine a fifth instruction stored on a seventh page;
finding an eighth page through the fifth page walk;
performing a logical OR on a group of bits in a third leaf level entry corresponding to the eighth page;
determining that the result of the logical OR is '1'; and
performing a view switch to a second paging structure without exiting the virtual machine.

13. The method of claim 12, wherein the first group of bits does not include the first bit or the fourth bit.

14. The method of claim 13, further comprising programming a control structure for the virtual machine with the number of bits in the group.

15. The method of claim 14, further comprising finding in a control structure for the virtual machine a pointer to a table storing a pointer to the second paging structure.

16. The method of claim 15, further comprising finding the pointer to the second paging structure using a value stored in the group of bits.

17. The method of claim 8, further comprising determining that a write permission bit in each entry corresponding to the second page in each level of the first paging structure is cleared.

18. The method of claim 9, further comprising, after entering the virtual machine:
performing a third page walk through the first paging structure in response to a third attempt to execute in the virtual machine a third instruction stored on a fourth page;
finding the second page through the third page walk;
determining that a fifth bit in a third leaf level entry corresponding to the second page in the first paging structure is set;
determining that a corresponding sixth bit in a fourth entry corresponding to the fourth page in at least one level of the first paging structure is cleared;
determining that a corresponding seventh bit in a fifth entry corresponding to the fourth page in at least one level of the first paging structure is cleared; and
exiting the virtual machine to determine whether to allow access to the second page.

19. A system comprising:
a memory to store a first paging structure; and
a processor including:
a virtualization unit to transfer control of the processor to a virtual machine;
a memory management unit to perform, in response to a first attempt to execute on the virtual machine a first instruction stored on a first page, a first page walk through the first paging structure to find a second page and to allow access to the second page without exiting the virtual machine based at least in part on a first bit being set in a first leaf level entry corresponding to the second page in the first paging structure and a corresponding second bit being set in each entry corresponding to the first page in each level of the first paging structure.

20. The system of claim 19, wherein:
the memory is also to store a second paging structure; and
the memory management unit is also to perform, in response to a second attempt to execute on the virtual machine a second instruction stored on a third page, a second page walk through the first paging structure to find the second page and to perform a view switch to the second paging structure without exiting the virtual machine based at least in part on logical OR of a group of bits in a second leaf level entry corresponding to the second page in the first paging structure being '1'.

* * * * *